(12) United States Patent
McCrary

(10) Patent No.: US 6,244,545 B1
(45) Date of Patent: Jun. 12, 2001

(54) SNAP-ON WIRE GUIDE

(75) Inventor: Donald McCrary, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/335,688

(22) Filed: Jun. 18, 1999

(51) Int. Cl.⁷ .................................................. F16L 3/00
(52) U.S. Cl. .................. 248/73; 248/74.2; 248/220.21
(58) Field of Search ................ 248/73, 74.2, 220.43, 248/220.21, 218.2, 229.26, 231.81, 303

(56) References Cited

U.S. PATENT DOCUMENTS

| 618,410 | 1/1899 | Goldsmith . | |
|---|---|---|---|
| 2,004,679 | * 6/1935 | Tinnerman | 248/73 |
| 2,014,971 | * 9/1935 | Knutson | 248/73 |
| 2,058,733 | 10/1936 | Smith . | |
| 2,065,843 | 12/1936 | Van Uum . | |
| 2,366,456 | 1/1945 | Pheazey . | |
| 2,563,240 | 8/1951 | Heath . | |
| 2,981,513 | * 4/1961 | Brown | 248/73 |
| 3,275,274 | * 9/1966 | Hutcheon | 248/309.1 |
| 3,345,706 | 10/1967 | Stokes . | |
| 4,356,987 | 11/1982 | Schmid . | |
| 5,149,027 | 9/1992 | Weber . | |
| 5,189,766 | 3/1993 | Weber . | |
| 5,884,398 | * 3/1999 | Eldridge et al. | 29/843 |

* cited by examiner

Primary Examiner—Anita M. King
Assistant Examiner—Naschica Morrison
(74) Attorney, Agent, or Firm—Burns, Doane, Swecker & Mathis, LLP

(57) ABSTRACT

A retaining device includes a body portion and at least two legs extending from the body portion. The device further includes a construction for securing the retaining device such that the yield point of the material forming the retaining device must be exceeded in order to achieve operative release of this securing construction. In preferred embodiments, the retaining device is formed from a spring metal material having a round cross section.

12 Claims, 3 Drawing Sheets

SNAP-ON WIRE GUIDE

At least some aspects of this invention may have been made with Government support under contract no. F08626-96-C-0002. The Government may have certain rights in this invention.

FIELD OF THE INVENTION

The invention relates to retainers and retainer clips in general. In particular, the present invention relates to a snap-on retainer which is well-suited to harness wiring and retains the same in its proper position.

BACKGROUND OF THE INVENTION

Retaining hardware of various types have been in use for some time. One type of conventional retainer is a bonding tie or strip. Such devices must be manually secured about the object which is being retained. Such manual securing procedures are time consuming and labor intensive. Therefore, various types of "snap-on" retainers have been developed as an alternative to such manually secured bonding ties. However, conventional snap-on retainers possess certain disadvantages. For instance, conventional snap retainers often times lack versatility. In other words, the number of different surface profiles to which the retainers can be attached is somewhat limited. Moreover, the shape and dimensions of some conventional retainers prohibit attachment in compact or cramped spaces.

Certain conventional snap-on retainers lack the durability and strength to secure objects without becoming inadvertently disengaged when placed in certain environments.

For example, U.S. Pat. No. 3,345,706 to Stokes, U.S. Pat. No. 4,356,987 to Schmid, U.S. Pat. No. 5,149,027 to Weber, and U.S. Pat. No. 5,189,766 also to Weber each disclose a clip or snap-fit holder formed from a plastic material. Such snap-fit holders often lack the strength and durability required over time to meet the requisite performance requirements in certain applications.

Other snap-fit retainers which are formed from metallic materials possess other disadvantages. Even these conventional metal snap-fit retainers often lack the strength required to meet the performance requirements in certain environments or applications. Such conventional metallic snap-on retainers can be inadvertently disengaged from the anchoring surfaces to which they are attached. Also, conventional metallic retainers are often formed from a flat strip of metal with squared edges which can chafe or abrade the surface of objects being retained.

For example, U.S. Pat. No. 2,058,733 to Smith, U.S. Pat. No. 2,065,843 to Van Uum, U.S. Pat. No. 2,366,456 to Pheazey, U.S. Pat. No. 2,563,240 to Heath and U.S. Pat. No. 2,981,513 to Brown each disclose metallic retaining clips or fasteners made from a flat strip of material having sharp squared edges which can abrade the object being retained. Such abrasion is especially undesirable when the retainers are being used to hold electrical wiring.

U.S. Pat. No. 618,410 to Goldsmith discloses a display card having fastening devices anchored thereto. The fastening devices are formed from a metallic material and are secured to the display card by legs 7 which are bent in opposite directions at right angles. This construction can lack the strength to remain secured or anchored into the surface of the object to which it is attached in certain environments or applications.

Therefore, it would be desirable to provide a low cost retaining device which can be "snapped on" or otherwise easily mounted to the surface to which it is anchored. It also be desirable to provide a retainer having the shape and dimensions which would enable it to be fitted into very small volumes, and which could be easily mounted to a number of different surface profiles. It would also be desirable to provide such retainers with high strength and resistance to inadvertent disengagement from its secured position during use. Finally, it would be desirable to provide such retainers with a construction which would avoid chaffing or abrading the object being retained.

SUMMARY OF THE INVENTION

These and other objectives can be achieved by constructing a retaining device in accordance with the principles of the present invention.

In one preferred embodiment, a retaining device constructed consistent with the principles of the present invention includes a retaining device comprising a body portion, at least two legs extending from said body portion, and means for securing said retaining device such that the yield point of the material of the retaining device must be exceeded in order to achieve operative release of the securing means.

In another preferred embodiment, the retaining device of the present invention includes a retaining device comprising a body portion, at least two legs extending from the body portion, a distal end section forming turned-up hook-like formations disposed on each leg, and the device has a round cross-section and is formed from a spring metal.

BRIEF DESCRIPTION OF THE DRAWINGS

Other objects and advantages of the present invention will become more apparent to those skilled in the art from reading the following detailed description of preferred embodiments in conjunction with the accompanying drawings, wherein like elements have been designated with like reference numerals, and wherein.

DETAILED DESCRIPTION OF THE PREFERRED EMBODIMENTS

Figure 1:
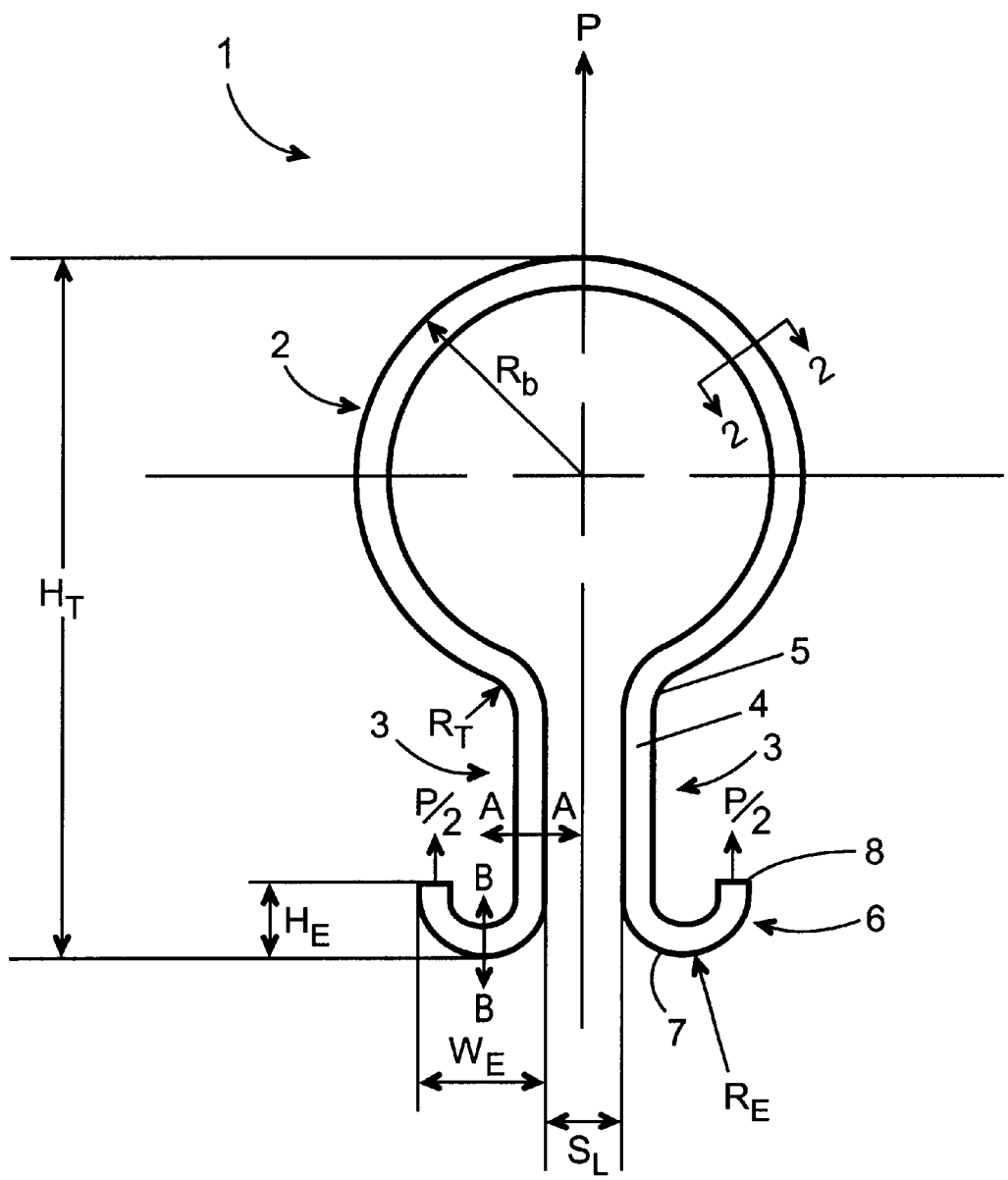
FIG. 1 is a plan view of a retaining device constructed according to an exemplary embodiment of the present invention.

FIG. 1 represents a plan view of a preferred retaining device construction. In the illustrated embodiment, retaining device 1 includes an arcuate or tubular body section 2. It should be noted that body section 2 could be modified to possess different shapes than that illustrated in FIG. 1. For example, depending upon the particular application of retaining device 1, body section 2 may possess any polygonal shape or other arcuate shape. At least two legs 3 extend from body section 2. Each leg 3 is formed with a linearly extending section 4 which are connected to the body section 2 by an arcuate transition portion 5. Each leg 3 further includes a distal end section 6 connected to the linearly extending portion 4. In a preferred embodiment, each distal end section 6 is defined by an arcuate turned up portion 7 and a terminal end 8. However, it should be noted that the above described shape of each leg 3 can be modified from that illustrated. Consistent with the principles of the present invention, legs 3 can be constructed in any manner desired, so long as the retainer 1 is provided with means for securing the device such that the yield point of the material used to construct the retaining device must be exceeded in order to achieve operative release of the securing means. This characteristic will be explained in further detail below.

By way of example only, an exemplary embodiment, such as the one illustrated in FIG. 1, can have the following approximate dimensions.

| Dimension | Value (inches) |
| --- | --- |
| $R_b$ (radius of body section 2) | 0.12–0.22 |
| $R_T$ (radius of curvature of transition portion 5) | 0.03 max |
| $R_E$ (radius of curvature of arcuate end section 7) | 0.04 |
| $H_T$ (total height of retainer 1) | 0.43–0.53 |
| $H_E$ (height of end section 6) | 0.05 |
| $W_E$ (width of end section 6) | 0.06–0.08 |
| $S_L$ (spacing between legs 3) | 0.03–0.07 |

Figure 2:
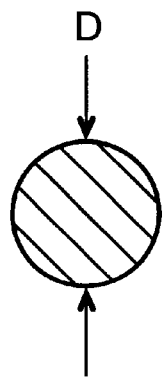
FIG. 2 is a sectional view of the retaining device of FIG. 1 taken along line 2—2.

The retainer 1 of the present invention is constructed of a material having properties which give the retainer 1 suitable strength and resilience. In preferred embodiments, the retainer 1 should be constructed from a material possessing a yield strength on the order of at least 30,000 psi. By way of example, certain spring metal compositions, such as ASTM-A313 S30200 may be used to construct the retainer 1. As illustrated in FIG. 2, in preferred embodiments, retainer 1 is provided with a circular cross section which avoids chaffing or abrasion of the object being retained within the body section 2 of retainer 1. In the illustrated embodiment of FIG. 2, the cross section of retainer 1 is provided with a diameter D on the order of 0.020 inches. The diameter D may be varied to the particular application of retainer 1. Moreover, precise shape of the cross section of retainer 1 may also be varied according to differing applications of the retainer 1. The cross section of retainer 1 may possess an elliptical or other arcuate shape consistent with the principles outlined above.

In preferred embodiments, retainer 1 is shaped and dimensioned such that upon installation, the legs 3 of retainer 1 must be crossed in order to insert the end of retainer 1 within the anchoring surface. A retainer shaped and dimensioned consistent with the principles of the present invention outlined above, is compact and can be readily inserted into a number of different surface profiles.

Figure 3:
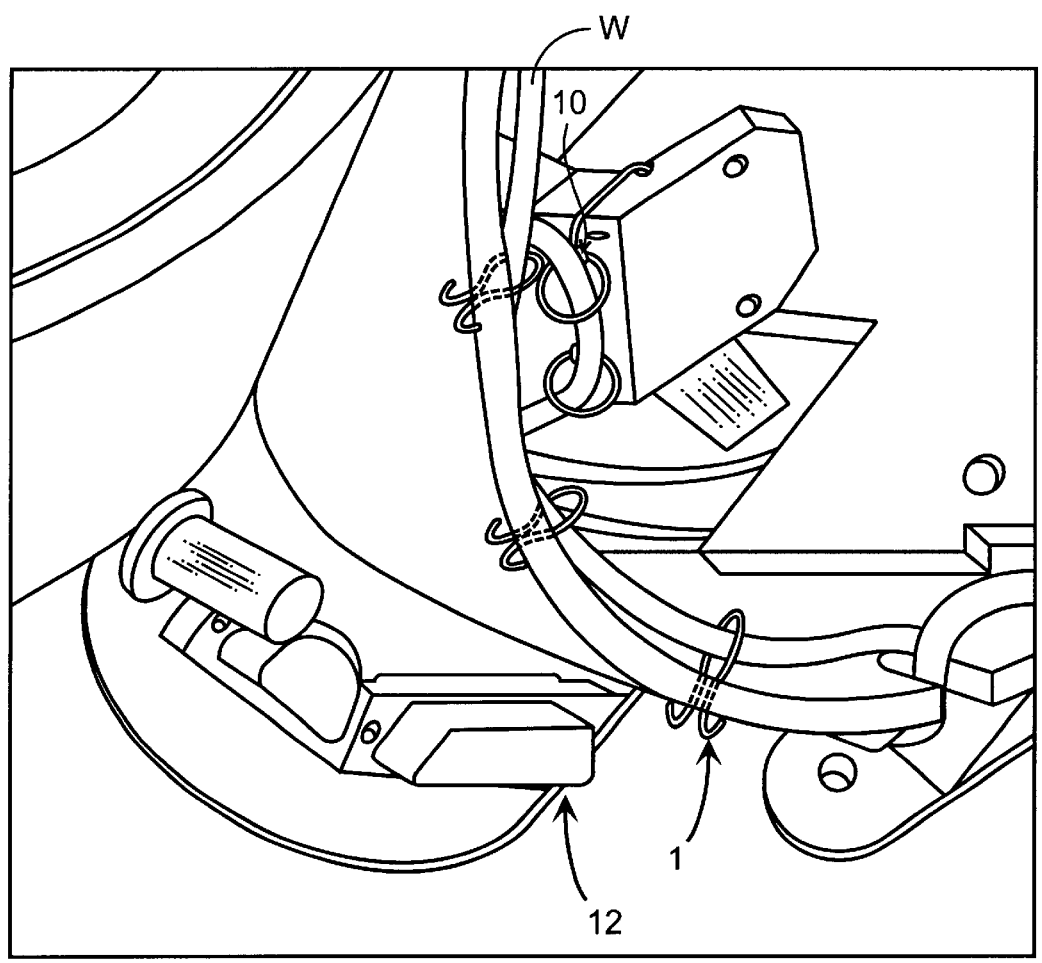
FIG. 3 is a perspective view of an exemplary embodiment of a retaining device constructed according to the principles of the present invention disposed in a steering gimbal of a target seeking device.

As illustrated in FIG. 3, a retainer 1 constructed according to the present invention may be used to retain wiring W in a steering gimbal 12 of a target seeking device. As illustrated in FIG. 3, retainer devices 1 may be readily inserted into through holes 10 formed in the steering gimbal device 12.

Figure 4:
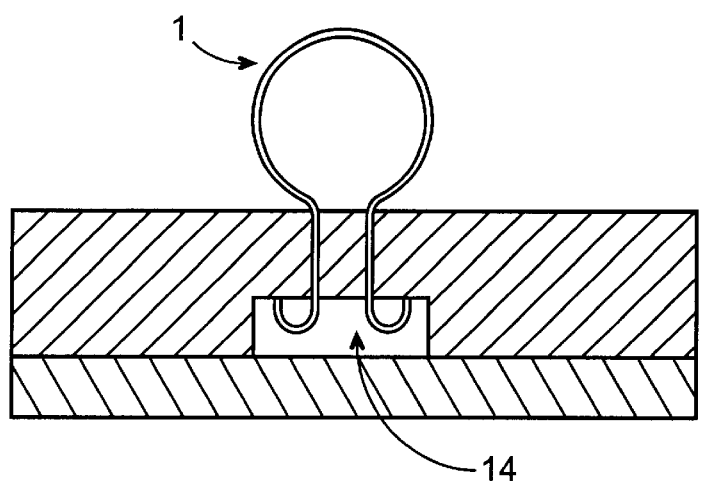
FIG. 4 is a sectional view of an exemplary embodiment of a retaining device constructed according to the principles of the present invention disposed in a blind hole surface profile.
Figure 5:
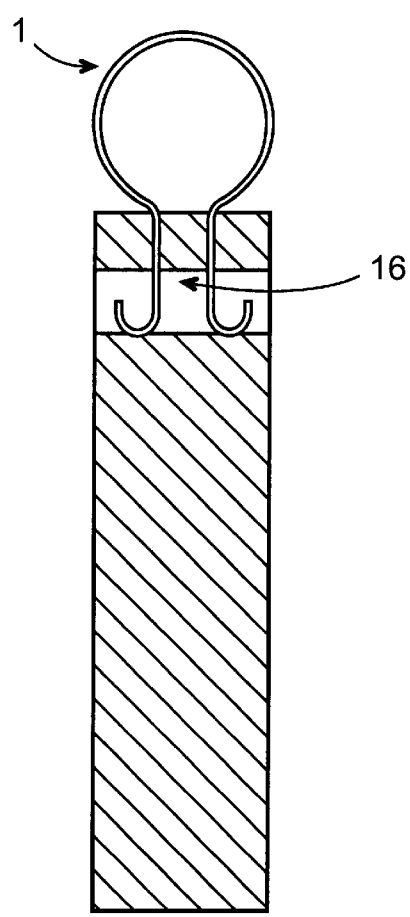
FIG. 5 is a sectional view of an exemplary embodiment of a retaining device constructed according to the principles of the present invention disposed in a cross drilled hole surface profile.

As further illustrated in FIGS. 4 through 5, retaining device 1 may be readily inserted into other surface profiles such as a blind hole 14 (FIG. 4) or a cross drilled hole 16 (FIG. 5). Of course, one of ordinary skill in the art could find numerous other applications for retaining device 1.

Once a retaining device 1 constructed according to the principles of the present invention has been anchored and is in an operable condition (e.g. as shown in FIGS. 3 through 5), retaining device 1 may be removed only by exceeding the yield strength of the material from which retaining device 1 is constructed. By this construction, unintentional disengagement of retaining device 1 is thereby avoided.

Upon application of a pull out force P to the body section 2 of retainer 1, a pull out force P/2 is applied to each leg 3 as illustrated in FIG. 1. The behavior of retainer 1 upon application of the pull out force can be described by reference to the following elemental limit analysis.

$$F = \frac{\pi r^2}{2} Sy$$
$$Sy = 30{,}000 \text{ psi}$$
$$Mp = 0.424 DF$$
$$= \frac{0.0085 \pi (0.01)^2}{2} Sy$$
$$= 0.04006 \text{ in-lb.}$$
$$\text{let } Mp = P/2 \times 0.08$$
$$P = \frac{2Mp}{0.08} = 1.00 \text{ lb}$$

where: 
$F$ = force $Sy$ = yield strength of the material of the retainer $Mp$ = limit bending moment $D$ = diameter of the cross section of the retainer $r$ = radius of the cross section of the retainer $P$ = pull out force.

When P=1.00 lb., retainer 1 will yield along section A—A as illustrated in FIG. 1. As P increases, more sections of the retainer will yield. When P=2.00 lb., retainer 1 will yield at section B—B. At this time, the retainer 1 can be removed. It should be noted, that due to variations in the yield strength of materials used to construct retainer 1 and the analysis employed, the pull out force may vary somewhat from the above-described values.

By providing a retainer with the construction outlined above, performance of such devices may be greatly enhanced. Certain applications require that such retainers remain operative for extended periods of time under relatively harsh operating conditions, such as the aforementioned steering gimbal assembly illustrated in FIG. 3. A retaining device constructed according to the principles of the present invention represents a significant advance in the performance capabilities of such retainers when compared to prior art constructions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A retaining device comprising:

a body portion;

at least two legs extending from said body portion;

means for operatively securing said retaining device; and wherein a pull-out force of approximately 2 lbs. is required to effect operative release of the securing means.

2. The device of claim 1, wherein the means for securing is disposed on the legs of the device.

3. The device of claim 1, wherein the means for securing comprises a distal end section on each of the legs which define turned-up hook-like formations.

4. The device of claim 3, wherein the device comprises:

a tubular body portion; and each of the legs comprise a linearly-extending portion which is connected to the tubular body portion by an arcuate transition portion.

5. The device of claim 4, wherein the distal end sections extend from the linearly-extending portion of each of the legs.

6. The device of claim 1, wherein the device is constructed as a one-piece monolithic member from a spring metal.

7. The device of claim 1, wherein the device has a round cross section, the round-cross-section has a diameter of approximately 0.020 inches.

8. The device of claim 1, wherein the device is constructed from a material having a yield strength of at least about 30,000 psi.

9. A retaining device comprising:

a body portion;

at least two legs extending from the body portion;

a distal end section forming turned-up hook-like formations disposed on each leg;

the device has a round cross-section and is formed from a spring metal; and wherein a pull-out force of approximately 2 lbs. is required to effect operative release of the device.

10. The device of claim 9, wherein the round cross-section has a diameter of approximately 0.020 inches.

11. The device of claim 9, wherein the device comprises:

a tubular body portion; and each of the legs comprise a linearly-extending portion which is connected to the tubular body portion by an arcuate transition portion.

12. The device of claim 9, wherein the device material from which the device is constructed has a yield strength of at least about 30,000 psi.

* * * * *